US012545271B2

(12) United States Patent
Blais et al.

(10) Patent No.: US 12,545,271 B2
(45) Date of Patent: Feb. 10, 2026

(54) CONTROLLING PERMISSIONS OF VEHICLE SIGNALS

(71) Applicant: BlackBerry Limited, Waterloo (CA)

(72) Inventors: Pierre Pierre Blais, Kanata (CA);
Xavier Javornicki, Ottawa (CA);
Geordon Thomas Ferguson,
Mississauga (CA)

(73) Assignee: BlackBerry Limited, Waterloo (CA)

(*) Notice: Subject to any disclaimer, the term of this patent is extended or adjusted under 35 U.S.C. 154(b) by 152 days.

(21) Appl. No.: 18/175,745

(22) Filed: Feb. 28, 2023

(65) Prior Publication Data

US 2024/0286630 A1 Aug. 29, 2024

(51) Int. Cl.
B60W 50/08 (2020.01)
B60W 50/00 (2006.01)
H04W 4/40 (2018.01)
H04W 12/08 (2021.01)

(52) U.S. Cl.
CPC ... *B60W 50/085* (2013.01); *B60W 2050/0043* (2013.01)

(58) Field of Classification Search
None
See application file for complete search history.

(56) References Cited

U.S. PATENT DOCUMENTS 5,956,715 A * 9/1999 Glasser ............... G06F 16/185
707/999.009
2017/0001649 A1 1/2017 Dickow
2019/0020985 A1 * 1/2019 Dai ......................... H04W 8/26
2020/0137575 A1 4/2020 Scholl et al.
2021/0398364 A1 12/2021 Tschache et al.

FOREIGN PATENT DOCUMENTS

WO WO-2022188809 A1 * 9/2022 ........... G06F 21/121

OTHER PUBLICATIONS

Aust, Stefan, "Vehicle API and Service Catalog for Next Generation Mobility," Jan. 20, 2023, IEEE, 2022 25th International Symposium on Wireless Personal Multimedia Communications (WPMC), pp. 418-423 (Year: 2023).*
Nafaji, Maryam et al., "Data leakage prevention model for vehicular networks," Nov. 15, 2022, IEEE, 2022 18th International Conference on Wireless and Mobile Computing, Networking and Communications (WiMob), pp. 124-129 (Year: 2022).*
Sameen Chishti, Mohd et al., "Decentralized On-Chain Data Access via Smart Contracts in Ethereum Blockchain," Oct. 18, 2021, IEEE, IEEE Transactions on Network and Service Management (vol. 19, Issue: 1, Mar. 2022), pp. 174-187 (Year: 2021).*

(Continued)

*Primary Examiner* — Madison R. Inserra
(74) *Attorney, Agent, or Firm* — Fish & Richardson P.C.

(57) ABSTRACT

Systems, methods, and software can be used to control permissions of vehicle signals. In some aspects, one example method includes: receiving a permission map, wherein the permission map comprises a configured permission value of a permission element of a node in a vehicle signal catalog; and setting a permission value of the permission element of the node in the vehicle signal catalog according to the configured permission value in the permission map.

12 Claims, 6 Drawing Sheets

(56) References Cited

OTHER PUBLICATIONS

Ashutosh, Ashish et al., "XACML for Mobility (XACML4M)—An Access Control Framework for Connected Vehicles," Feb. 4, 2023, MDPI, Sensors 2023: Security, Privacy and Trust in Connected and Automated Vehicles, pp. 1-33 (Year: 2023).*
Extended European Search Report in European Appln. No. 24159044.7, mailed on May 28, 2024, 8 pages.
Office Action in European Appln. No. 24159044.7, mailed on Mar. 25, 2025, 7 pages.

* cited by examiner

CONTROLLING PERMISSIONS OF VEHICLE SIGNALS

TECHNICAL FIELD

The present disclosure relates to controlling permissions of vehicle signals.

BACKGROUND

A vehicle can include a large number of sensors emitting or generating signals that are constantly reporting state changes in what they are monitoring. These signals can be used to determine the status of different aspects of the vehicle. The vehicle or an entity in the vehicle can further set different values for these signals to control the operation of the vehicle.

DESCRIPTION OF DRAWINGS

Like reference numbers and designations in the various drawings indicate like elements.

DETAILED DESCRIPTION

In some cases, vehicle signals may be defined in a signal catalog using Connected Vehicle Systems Alliance (COVESA)'s Vehicle Signal Specification (VSS). Such a signal catalog provides a normative definition of a set of signals that could be emitted or generated by sensors in a vehicle.

In some operations, non-native applications, e.g., applications running on an external device or third-party application installed on the vehicle, need access to some of the signals. The access may be read access, write access, or both. A vehicle needs to determine whether the non-native applications have the correct permission to access these signals.

In some implementations, the read and write permission of the vehicle signals can be set by using different permission values. In some cases, the permission value of the vehicle signal can be set based on nodes of the tree-structure of a signal catalog defined using the VSS. Software or hardware in the vehicle can compare the permission value of the vehicle signal or the node in the signal catalog with the permission value of the entity that requests the access, e.g., the non-native applications discussed previously, to determine whether to grant the access. The approach described in this disclosure provides an efficient way to control the access to the vehicle signals, prevent security breaches, and protect the safety of the vehicle operation. FIGS. 1-6 and associated descriptions provide additional details of these implementations.

Figure 1:
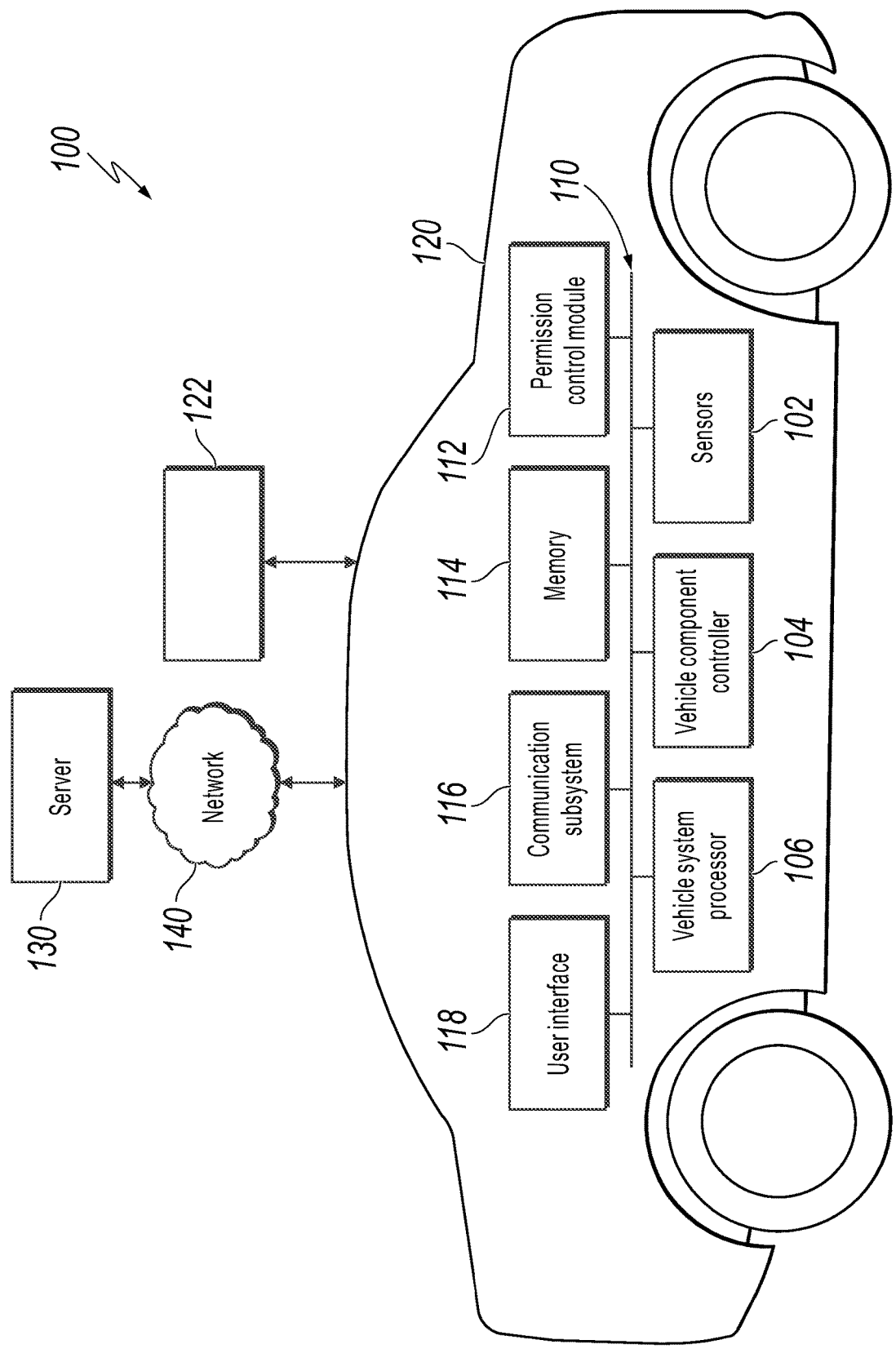
FIG. 1 is a schematic diagram showing an example communication system that controls permissions of vehicle signals, according to an implementation.

FIG. 1 is a schematic diagram showing an example communication system 100 that controls permissions of vehicle signals, according to an implementation. At a high level, the example communication system 100 includes a vehicle 120 that is communicatively coupled with an application 122. The vehicle 120 is also communicatively coupled with a server 130 over a network 140.

The vehicle 120 can include a motor vehicle (e.g., automobile, car, truck, bus, motorcycle, etc.), aircraft (e.g., airplane, unmanned aerial vehicle, unmanned aircraft system, drone, helicopter, etc.), spacecraft (e.g., spaceplane, space shuttle, space capsule, space station, satellite, etc.), watercraft (e.g., ship, boat, hovercraft, submarine, etc.), railed vehicle (e.g., train, tram, etc.), and other types of vehicles including any combinations of any of the foregoing, whether currently existing or after arising. In the illustrated example, the vehicle 120 includes one or more sensors 102, a vehicle component controller 104, a vehicular system processor 106, a communication subsystem 116, a user interface 118, memory 114, and permission control module 112, that are connected to a bus 110.

In some cases, a vehicle can include one or more sensors. The one or more sensors can generate inputs, e.g., video or audio inputs, that reflect the surroundings or environment inside of the vehicle. Examples of the sensors can include cameras, microphones, laser, radar, ultrasonic, light detection and ranging (LIDAR) or any other sensors.

The vehicle 120 includes one or more sensors 102 that detect or measure information for the vehicle 120. Examples of the sensors 102 can include sensors that capture environmental information that is external to the vehicle 120, such as cameras, microphones, laser, radar, ultrasonic, light detection and ranging (LIDAR), and the like. These sensors can provide environmental inputs for an automatic processing platform operating on the vehicle 120 to make automatic decisions. Examples of the sensors 102 can also include devices that capture information that is internal to the vehicle 120, such as monitors for components such as engine, battery, fuel, electronic system, cooling systems, and the like. These sensors can provide operation status and warnings to the automatic processing platform operating on the vehicle 120. Examples of the sensors 102 can also include acoustic sensors that can detect the sound level inside the vehicle 120. The acoustic sensors can determine the noise level inside the vehicle 120 or provide input to other signal processors that determine the noise level.

The vehicle 120 includes a vehicle component controller 104. Although illustrated as a vehicle component controller 104 in FIG. 1, the vehicle 120 can include two or more vehicle component controllers 104. The vehicle component controller 104 represents a controller that controls the operation of a component on the vehicle 120. Examples of the components can include engine, accelerator, brake, radiator, battery, steering wheel, transmission system, cooling system, electrical system, entertainment system, and any other components of the vehicle 120. For example, the vehicle component controller 104 can control the speaker system of the vehicle 120, including controlling the volume, balance, fade, and any other settings for audio output inside the vehicle 120. The vehicle component controller 104 can operate a respective component automatically, according to input from the vehicular system processor 106, or a combination thereof. In some implementations, the vehicle component controller 104 can include a data processing apparatus.

The vehicular system processor 106 can include one or more processing components (alternatively referred to as "processors" or "central processing units" (CPUs)) configured to execute instructions related to one or more of the processes, steps, or actions for the automatic processing platform operating on the vehicle 120. Generally, the vehicular system processor 106 executes instructions and manipulates data to perform the operations of the automatic processing platform. The vehicular system processor 106 can receive inputs from the sensors 102 and generate commands to the vehicle component controller 104. In some cases, the vehicular system processor 106 can perform automatic operations. In some cases, the vehicular system processor 106 can include a data processing apparatus.

The communication subsystem 116 can be configured to provide wireless or wireline communication for data or control information of the vehicle 120. For example, the communication subsystem 116 can support transmissions over wireless local area network (WLAN or WI-FI™), near field communication (NFC), infrared (IR), Radio-frequency identification (RFID), BLUETOOTH™ (BT), Universal Serial Bus (USB), or any other short-range communication protocols. The communication subsystem 116 can also support Global System for Mobile communication (GSM), Interim Standard 95 (IS-95), Universal Mobile Telecommunications System (UMTS), CDMA2000 (Code Division Multiple Access), Evolved Universal Mobile Telecommunications System (E-UMTS), Long Term Evaluation (LTE), LTE-Advanced, 5G, or any other radio access technologies. The communication subsystem 116 can include, for example, one or more antennas, a receiver, a transmitter, a local oscillator, a mixer, and a digital signal processing (DSP) unit. In some implementations, the communication subsystem 116 can support multiple input multiple output (MIMO) transmissions. In some implementations, the receivers in the communication subsystem 116 can be an advanced receiver or a baseline receiver.

The user interface 118 can include, for example, any of the following: one or more of a display or touch screen display (for example, a liquid crystal display (LCD), a light emitting diode (LED), an organic light emitting diode (OLED), or a micro-electromechanical system (MEMS) display), a keyboard or keypad, a trackball, a speaker, or a microphone. The user interface 118 can also include an I/O interface, for example, a universal serial bus (USB) interface.

The memory 114 can be a computer-readable storage medium. Examples of the memory 114 include volatile and non-volatile memory, magnetic media, optical media, random access memory (RAM), read-only memory (ROM), removable media, and others. The memory 114 can store an operating system (OS) of the vehicle 120 and various other computer-executable software programs for performing one or more of the processes, steps, or actions described above.

Figure 2:
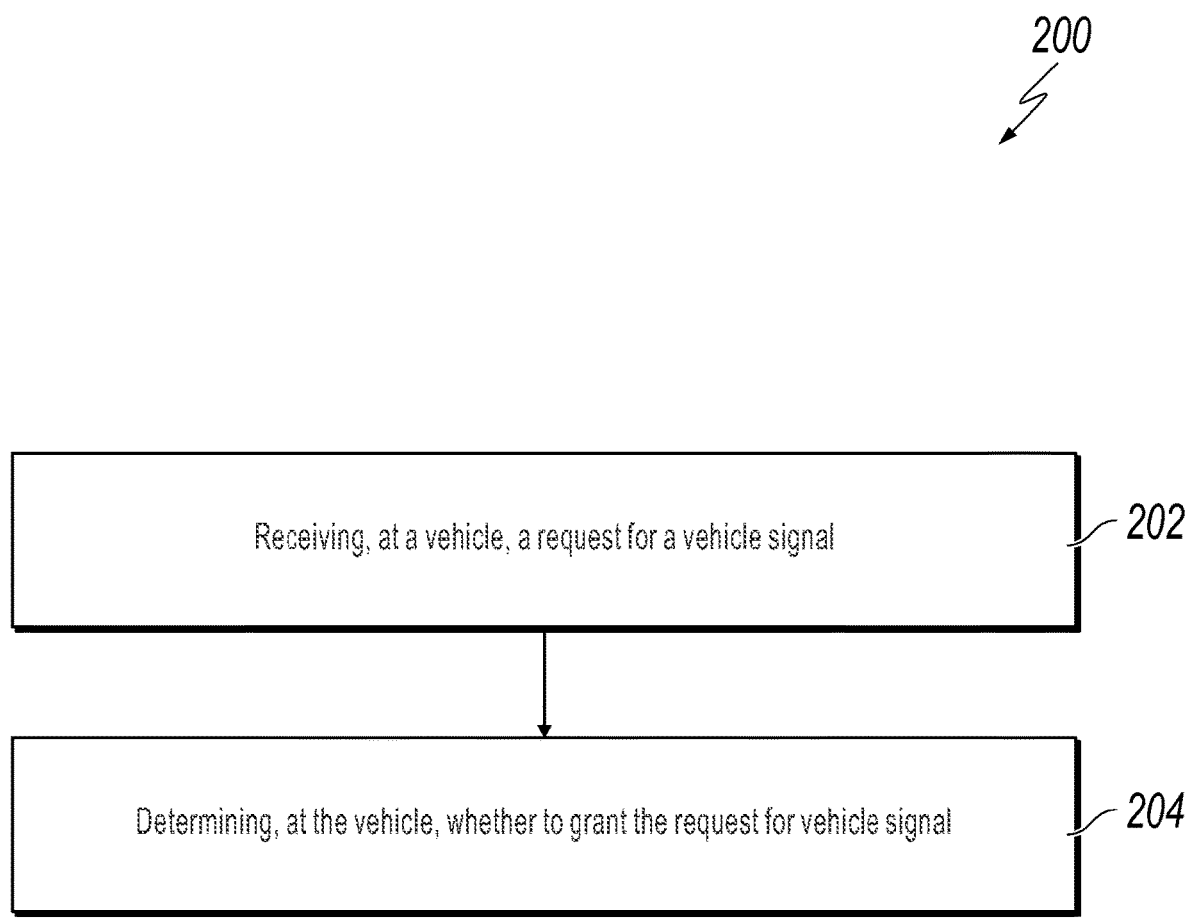
FIG. 2 is a flow diagram showing an example method that controls permissions of vehicle signals, according to an implementation.

The permission control module 112 represents an application, a set of applications, software, software modules, hardware, or any combination thereof that can be configured to control access permission of the vehicle signals of the vehicle 120. In some implementations, the permission control module 112 can receive a request for vehicle signals, e.g., from application 122. The request can be for read, write, or both. The permission control module 112 determines whether to grant the request based on the permission element of the requested vehicle signal. In some cases, the permission control module 112 determines whether to grant the request further based on the permission element of the entity that requests the vehicle signal. FIG. 2 and associated descriptions provide additional details of these implementations. In some implementations, the permission control module 112 can be implemented as a separate software program or part of a software program stored in the memory 114 and executed by the vehicular system processor 106.

As illustrated, the bus 110 provides a communication interface for components of the automatic processing platform operating on the vehicle 120. In some cases, the bus 110 can be implemented using a Controller Area Network (CAN) bus.

The application 122 represents an application, a set of applications, software, software modules, hardware, or any combination thereof that request the vehicle signal. In some cases, the application can be executed on an electronic device that connects with the vehicle 120. Such an electronic device may include, without limitation, any of the following: endpoint, computing device, mobile device, mobile electronic device, user device, mobile station, subscriber station, portable electronic device, mobile communications device, wireless modem, wireless terminal, or another electronic device. Examples of an endpoint may include a mobile device, IoT (Internet of Things) device, EoT (Enterprise of Things) device, cellular phone, personal data assistant (PDA), smart phone, laptop, tablet, personal computer (PC), pager, portable computer, portable gaming device, wearable electronic device, health/medical/fitness device, camera, or other mobile communications devices having components for communicating voice or data via a wireless or wired communication network. The electronic device can also be a peripheral device, such as a headset, a remote controller, or a display. The electronic device can connect with the vehicle 120 using short-range communication technology. The short-range communication technology can be wireless, such as BT, NFC, WLAN. The short-range communication technology can also be wired, such as USB.

In some cases, the application 122 can also be installed on the vehicle 120. For example, the application 122 can be a third-party application that controls some operations of the vehicle 120.

The server 130 represents an application, a set of applications, software, software modules, hardware, or any combination thereof that can be configured to manage permission controls of the vehicle 120. In some implementations, the server 130 can receive, store, send, and adjust the values of permission elements in the vehicle 120, permission values of the application or both.

The example communication system 100 includes the network 140. The network 140 represents an application, set of applications, software, software modules, hardware, or a combination thereof, that can be configured to transmit data between the server 130 and the vehicle 120 in the communication system 100. The network 140 includes a wireless network, a wireline network, or a combination thereof. For example, the network 140 can include one or a plurality of radio access networks (RANs), core networks (CNs), and external networks. The RANs may comprise one or more radio access technologies. In some implementations, the radio access technologies may be Global System for Mobile communication (GSM), Interim Standard 95 (IS-95), Universal Mobile Telecommunications System (UMTS), CDMA2000 (Code Division Multiple Access), Evolved Universal Mobile Telecommunications System (E-UMTS), Long Term Evaluation (LTE), LTE-Advanced, 5G, or any other radio access technologies. In some instances, the core networks may be evolved packet cores (EPCs).

A RAN is part of a wireless telecommunication system which implements a radio access technology, such as UMTS, CDMA2000, 3GPP LTE, 3GPP LTE-A, and 5G. In many applications, a RAN includes at least one base station.

A base station may be a radio base station that may control all or at least some radio-related functions in a fixed part of the system. The base station may provide radio interface within its coverage area or a cell for a mobile device to communicate. The base station may be distributed throughout the cellular network to provide a wide area of coverage. The base station directly communicates to one or a plurality of mobile devices, other base stations, and one or more core network nodes.

While elements of FIG. 1 are shown as including various component parts, portions, or modules that implement the various features and functionality, nevertheless, these elements may, instead, include a number of sub-modules, third-party services, components, libraries, and such, as appropriate. Furthermore, the features and functionality of various components can be combined into fewer components, as appropriate.

FIG. 2 is a flow diagram showing an example method 200 that controls permissions of vehicle signals or nodes in a signal catalog, according to an implementation. The method 200 can be implemented by the entities shown in FIG. 1, including, for example, the vehicle 120. The method 200 shown in FIG. 2 can also be implemented using additional, fewer, or different entities. Furthermore, the method 200 shown in FIG. 2 can be implemented using additional, fewer, or different operations, which can be performed in the order shown or in a different order. In some instances, an operation or a group of operations can be iterated or repeated, for example, for a specified number of iterations or until a terminating condition is reached.

At 202, the vehicle receives an access request for a vehicle signal or a node in a signal catalog. As discussed below, the node in a signal catalog can be a data entry node or a branch node. In some cases, the request can be received from an application, e.g., the application 122 in FIG. 1. The application can execute on an electronic device outside of the vehicle, where the request can be sent by using a wireless or wireline connection, e.g., BLUETOOTH™, NFC, WI-FI™, LTE, 5G, USB or any other local or wide area network communication technologies. The application can also execute on the vehicle, e.g., a third-party application that is installed on the operating system of the vehicle.

The vehicle signal represents the signals that carries information of the vehicle operations. Examples of the information carried by the vehicle signal include information related to driving operations, e.g., speed, acceleration, location, and etc., information related to entertainment operations, e.g., volumes of audio speakers, information related to cabin operations, e.g., air conditioning (AC) setting, position of the seats, and etc., and any other information related to the operation of the vehicle.

In some cases, Vehicle Signal Specification (VSS) developed by the Connected Vehicle Systems Alliance (COVESA) can be used to provide the common format/structure for the vehicle signals. VSS introduces a domain taxonomy for vehicle signals that can be used as standard in automotive applications to communicate information about the vehicle. VSS defines vehicle signals, in a tree like structure, in the sense of classical attributes, sensors, and actuators with the raw data communicated over vehicle buses and data that is more commonly associated with the infotainment system alike. COVESA defines a catalog of signals. More generally, a catalog of signals can be referred to as a "signal catalog". The signal catalog is organized into a tree structure where data entry nodes are the leaf nodes and branch nodes regroup sets of data entry nodes as well as sub-branches. Each data entry node defines a particular vehicle signal using a number of elements such as type (e.g., sensor, actuator, attribute), datatype (e.g., integer, floating point, string, etc.), and unit (e.g., km/h, Celsius, etc.).

Tables 1 is an example of the signal structure/format defined for the vehicle signals according to the COVESA VSS:

TABLE 1 example vehicle signals (signal type and data type)

| Node Name | Signal Type | Data Type |
| --- | --- | --- |
| Vehicle | Root | |
| Vehicle.Cabin | Branch | |
| Vehicle.Cabin. Seat | Branch | |
| Vehicle.Cabin. Seat.Row1 | Branch | |
| Vehicle.Cabin. Seat.Row1.Pos1 | Branch | |
| Vehicle.Cabin. Seat.Row1.Pos1.Tilt | actuator | float |
| Vehicle.Cabin. Seat.Row1.Pos3 | branch | |
| Vehicle.Cabin. Seat.Row1.Pos3.Tilt | actuator | float |
| Vehicle.Speed | sensor | float |

Figure 4:
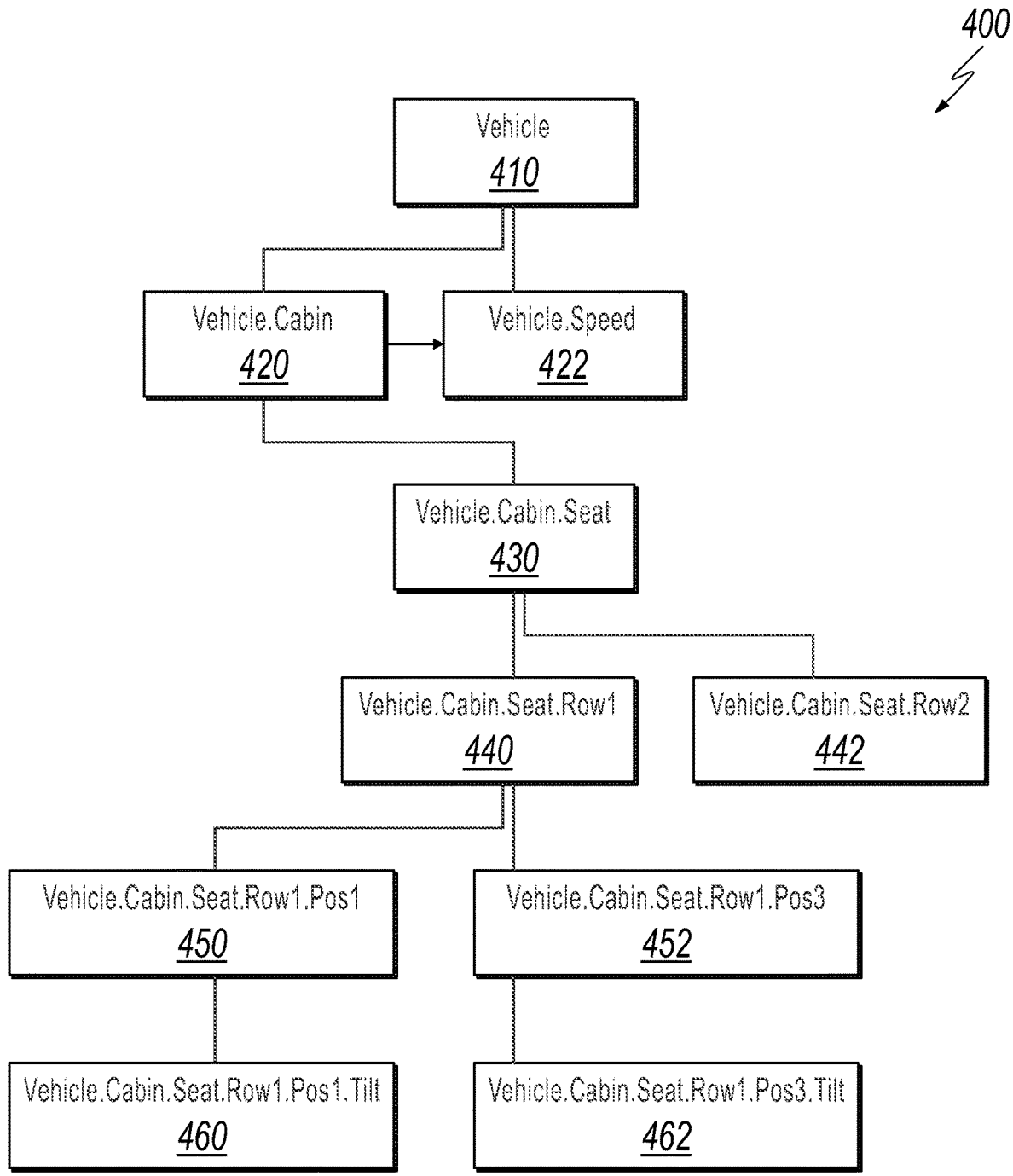
FIG. 4 is a diagram illustrating an example structure of vehicle signals, according to an implementation.

FIG. 4 is a diagram 400 illustrating a structure of vehicle signals, according to an implementation. Each node in the diagram 400 represents a vehicle signal. The node 410 is the root node for the Vehicle. The node 410 has sub-nodes Vehicle.Cabin 420 and Vehicle.Speed 422. The node Vehicle.Speed 422 is a leaf node, which do not have sub-nodes. The node Vehicle.Speed 422 has a data type of float, which indicates that a floating number is used to represent the value of the node Vehicle.Speed. Vehicle.Cabin 420 is a branch node, which has a sub-node Vehicle.Cabin.Seat 430. Vehicle.Cabin.Seat 430 is also a branch node, which has sub-nodes Vehicle.Cabin.Seat.Row1 440 and Vehicle.Cabin.Seat.Row2 442. Vehicle.Cabin.Seat.Row1 440 is also a branch node, which has sub-nodes Vehicle.Cabin.Seat.Row1.Pos1 450 and Vehicle.Cabin.Seat.Row1.Pos3 452. Vehicle.Cabin.Seat.Row1.Pos1 450 is a branch node, which has a sub-node Vehicle.Cabin.Seat.Row1.Pos1.Tilt 460. Vehicle.Cabin.Seat.Row1.Pos1.Tilt 460 is a leaf node that has a data type of float. Vehicle.Cabin.Seat.Row1.Pos3 452 is a branch node, which has a sub-node Vehicle.Cabin.Seat.Row1.Pos3.Tilt 462. Vehicle.Cabin.Seat.Row1.Pos3.Tilt 462 is a leaf node that has a data type of float. Though not illustrated, each of the branch node can have additional sub-nodes.

In addition to the signal type and data type, a data entry node that represents a vehicle signal can include other elements, e.g., min (representing minimum value of the signal), max (representing maximum value of the signal), and etc.

As seen from Table 1 above, a dot notates a name path to identify a component as a branch (a set of data entries) or a data entry (a sensor, actuator, or attribute). A sensor denotes a one-way signal originating from the vehicle (e.g., generated according to measurement of one or more sensors in the vehicle). An actuator denotes a two directional signal that can be "set" or "get" values (i.e., the signal can indicate the current status or be used to set the status). A branch is a node in a tree structure. An attribute is typically a fixed value. The sensors/actuators typically have a publisher (or producer) that updates the signal value continuously when a change occurs in a sensor, while an attribute has a set value that should typically not change more than once per ignition cycle. In some cases, the signals in Table 1 can be implemented using Extensible Markup Language (XML), JavaScript Object Notation (JSON) scripts, or another encoding format.

The request at 202 can be a read request, a write request, or a combination thereof. The read request indicates that the application requests to obtain the information represented by the vehicle signal or node, e.g., the speed of the vehicle. The write request indicates that the application requests to set the information represented by the vehicle signal or node, e.g., write the volume of a speaker on the vehicle.

In some cases, the request can include the path name or the identifier of the signal/node, e.g., Vehicle.VehicleIdentification or UUID (Universally Unique Identifier) of the signal/node defined in VSS, and the requested permission, e.g., read or write or both. In some cases, the request can also include the information of the requested application, e.g., an identifier of the application. The request can also include the permission(s) the application has been assigned to.

At 204, software or hardware on the vehicle determines whether to grant the request to access a vehicle signal or a node in the signal catalog. In some implementations, the determination is made based at least in part on a permission element of the vehicle signal or the node in the signal catalog deployed in the vehicle. If the access request is granted to a branch node in the signal catalog, access to all the nodes under the branch node is granted.

In some cases, in addition to the elements such as data type, min, or max discussed previously, one or more permission elements can be defined for the vehicle signal or each node in a signal catalog. For example, a permission element can be either a read permission element (e.g., "x-read-permission" to be discussed below) or a write permission element (e.g., "x-write-permission" to be discussed below). Alternatively, one permission element can be defined for both read and write permissions, and different values in the permission element can be used to define different read and write permissions, e.g., the first one or more bits in the permission element represent the read permission, and the second one or more bits in the permission element represent the write permission.

In some cases, the permission element for each vehicle signal/node can be set by the manufacturer of the vehicle, the operation administrator of the vehicle, the owner of the vehicle, the driver of the vehicle, or any combination thereof. The permission elements can be set directly at a user interface of the vehicle, or through a server, e.g., the server 130 in FIG. 1.

In some cases, the permission element can be defined as part of the VSS. Alternatively, or in combination, the permission element can be defined as a proprietary element, e.g., defined as x-read-permission or x-write-permission, where "x" indicates a proprietary, private, extended, or extra element. This approach can avoid conflicts of future definitions of permission related elements by the VSS.

In some cases, a different permission value can be defined for every node in the signal catalog tree. In this case, each node may have a different permission value. Alternatively, or in combination, a set of permission values can be used to control access to various sets of nodes in the signal catalog tree. For example, the following permission values can be pre-defined and used:

"READ_ACCESS": This can be assigned to the read permission element of nodes for which the access to obtaining the information is not restricted (e.g., vehicle speed).

"PERSONAL_INFO": This can be assigned to the read permission element of the nodes for which the access to obtaining the information is restricted to a selected group of applications, e.g., signals representing personal information such as driver identification, owner name, Vehicle Identification (VIN), insurance information, and etc. "READ_ACCESS" and "PERSONAL_INFO" are two permission values with different restriction/security levels that can be assigned to a read permission element.

"WRITE_ACCESS": This can be assigned to the write permission element of nodes for which the write access is restricted, e.g., signals related to vehicle operations such as acceleration, braking, turning, and cruise control. "WRITE_ACCESS" is a permission value that can be assigned to a write permission element.

There is a large number of vehicle signals or nodes defined in a signal catalog and it may be time consuming and error-prone if the permission element of each signal/node needs to be defined. In some cases, inheritance can be used to take advantage of the tree structure of VSS. This approach simplifies the assignment of permissions to a large number of nodes. In this approach, a permission value defined for a branch node also applies to all the sub-nodes of the branch node, unless a different permission value is defined for some of the sub-nodes. In this manner, there is no need to specify a permission value to each node in the signal catalog, instead the permission value can be automatically assigned to the nodes via inheritance. It provides an efficient mechanism for a vehicle manufacturer to define who can gain access to the vehicle signals represented as nodes in a signal catalog.

In one implementation of the inheritance approach, write permissions are only propagated to sub-nodes that are data entry nodes with an actuator signal type and sub-nodes that are themselves branch nodes.

In some cases, a permission map, as described below, can be used to define the permissions of vehicle signals of a vehicle. The permission map can include permission value of one or more nodes in the signal catalog, with the permission elements of the remaining nodes set based on the inheritance approach discussed previously. A software tool can be implemented to walk through the signal catalog tree and add the permission elements to each node and set its value according to the permission map.

Alternately or additionally, the signal catalog can include a default permission value for each node. The default can be overwritten by the manufacturer of the vehicle, the operation administrator of the vehicle, the owner of the vehicle, the driver of the vehicle, or any combination thereof.

Signal catalogs can be implemented using yet another markup language (YAML), JavaScript Object Notation (JSON) or any other formats.

The following are some examples for setting the permission of vehicle signals with a permission map by using JSON. In one example, a "READ_ACCESS" permission value is assigned to the "Vehicle.Speed" data entry node in a signal catalog.

```
{
  "x-read-permission": [
    {
      "permission": "READ_ACCESS",
      "nodes": [
        "Vehicle.Speed"
      ]
    }
  ]
}
```

The "x-read-permission" entry specifies that its sub-entries are applicable to the read permission element (matching the "x-read-permission" element) for each node in the signal catalog as specified under the "nodes" sub-entry.

The "permission" entry defines the permission value to be assigned. The "nodes" entry in the permission map defines the nodes which the permission value is assigned to. The "nodes" entry can be a list of multiple nodes, as more than one signal catalog node can be given the same permission.

The above permission map results in the "READ_ACCESS" permission being assigned to the "x-read-permission" element of the "Vehicle.Speed" data entry node (located under the "Vehicle" branch node in a signal catalog). The following are the elements of the Vehicle.Speed node in the signal catalog.

```
{
  "Speed": {
    "datatype": "float",
    "description": "Vehicle speed.",
    "type": "sensor",
    "unit": "km/h",
    "uuid": "efe50798638d55fab18ab7d43cc490e9",
    "x-read-permission": "READ_ACCESS"
  }
}
```

Note that, given that Vehicle.Speed is a "sensor" type data entry node, there is no "x-write-permission" element in its definition.

In another example, a "WRITE_ACCESS" permission value is assigned to the "Vehicle.ADAS.CruiseControl.IsEnabled" data entry node in the signal catalog. For simplicity, only the data entry node is shown in the example.

```
{
  "x-write-permission": [
    {
      "permission": "WRITE_ACCESS",
      "nodes": [
        "Vehicle.ADAS.CruiseControl.IsEnabled"
      ]
    }
  ]
}
```

Note that the type of the data entry node "Vehicle.ADAS.CruiseControl.IsEnabled" is "actuator" and therefore a permission element "x-write-permission" with permission value "WRITE_ACCESS" can be assigned to this node. The node can also have a permission element "x-read-permission" with permission value"READ_ACCESS", as shown below, which can be inherited from the branch node above this data entry node (e.g., the branch node Vehicle, Vehicle.ADAS, or Vehicle.ADAS.CruiseControl). The following are the elements of the node Vehicle.ADAS.CruiseControl.IsEnabled.

```
{
  "IsEnabled": {
    "datatype": "boolean",
    "description": "Indicated if cruise control system is enabled
       (e.g. ready to receive
configurations and settings) True = Enabled. False = Disabled.",
    "type": "actuator",
    "uuid": "018417f6c8535315895d0f54d209035a",
    "x-read-permission": "READ_ACCESS",
    "x-write-permission": "WRITE_ACCESS"
  }
}
```

In another example, a "READ_ACCESS" permission value that is assigned to a
branch node is further inherited by some sub-nodes of that branch node.
In the permission map, this would be configured as:

```
{
  "x-read-permission": [
    {
      "permission": "READ_ACCESS",
      "nodes": [
        "Vehicle"
      ]
    },
    {
      "permission": "PERSONAL_INFO",
      "nodes": [
        "Vehicle.VehicleIdentification.VIN"
      ]
    }
  ],
  "x-write-permission": [
    {
      "permission": "WRITE_ACCESS",
      "nodes": [
        "Vehicle"
      ]
    }
  ]
}
```

In the permission map, the "READ_ACCESS" read permission and "WRITE_ACCESS" write permission are assigned to the "Vehicle" branch node. Sub-nodes under the branch node "Vehicle", including all branch nodes and data entry nodes, inherit the read permission, unless they have been assigned their own permission in the permission map, which is the case for the "Vehicle.VehicleIdentification.VIN" data entry node. Vehicle.VehicleIdentification.VIN has been assigned its own permission, the "PERSONAL_INFO" read permission.

Sub-nodes under the branch node "Vehicle", including all branch nodes and data entry nodes that have "actuator" data type, also inherit the write permission, unless they have been assigned their own permission in the permission map. In other words, since the permission map does not specify any value of the write permission element for the nodes under the branch node "Vehicle", all the sub-branch nodes and data entry nodes having "actuator" data type under the branch node "Vehicle" inherit "WRITE_ACCESS" from the branch node "Vehicle". Since the permission map does not specify any value of the read permission element for the nodes under the branch node "Vehicle" except for "Vehicle.VehicleIdentification.VIN", all the nodes under the branch node "Vehicle" inherit "READ_ACCESS" from the branch node "Vehicle" except "Vehicle.VehicleIdentification.VIN".

In another example, we show the following nodes, for simplicity:

The "Vehicle" branch node at the top of tree.

The "Vehicle.RoofLoad" data entry node immediately under the "Vehicle" branch.

The "Vehicle.VehicleIdentification" branch node under the "Vehicle" branch.

The "Vehicle.VehicleIdentification.Model" data entry node under the "Vehicle.VehicleIdentification" branch.

The "Vehicle.VehicleIdentification.VIN" data entry node under the "Vehicle.VehicleIdentification" branch.

```
{
    "Vehicle": {
        "RoofLoad": {
            "datatype": "int16",
            "description": "The permitted total weight of cargo
                and installations (e.g., a
    roof rack) on top of the vehicle.",
            "type": "attribute",
            "unit": "kg",
            "uuid": "97dc98269a19591d9efa455a8d943c16",
            "x-read-permission": "READ_ACCESS"
        },
        "VehicleIdentification": {
            "Model": {
                "datatype": "string",
                "description": "Vehicle model.",
                "type": "attribute",
                "uuid": "dd3d3b72e6a85b3695ba25f829255403",
                "x-read-permission": "READ_ACCESS"
            },
            "VIN": {
                "datatype": "string",
                "description": "17-character Vehicle
                    Identification Number (VIN) as
    defined by ISO 3779.",
                "type": "attribute",
                "uuid": "6f0b6fa8c34f589baa92e565bc9df5bd",
                "x-read-permission": "PERSONAL_INFO"
            },
            "description": "Attributes that identify a vehicle.",
            "type": "branch",
            "uuid": "c33861c3e9125208b05f23fe922bf08e",
            "x-read-permission": "READ_ACCESS",
            "x-write-permission": "WRITE_ACCESS"
        },
        "description": "High-level vehicle data.",
        "type": "branch",
        "uuid": "ccc825f94139544dbb5f4bfd033bece6",
        "x-read-permission": "READ_ACCESS",
        "x-write-permission: "WRITE_ACCESS"
    }
}
```

The "Vehicle" branch node at the top of tree has been assigned the "READ_ACCESS" read permission and the "WRITE_ACCESS" write permission. Therefore, all the sub-nodes under the branch node "Vehicle" have the "READ_ACCESS" permission unless some nodes have been assigned their own read permission (e.g., "PERSONAL_INFO") in the permission map. All the sub-nodes under the branch node "Vehicle" have the "WRITE_ACCESS" permission except for data entry nodes with "sensor" or "attribute" data type.

The "Vehicle.RoofLoad" data entry node immediately under the "Vehicle" branch inherits the "READ_ACCESS" read permission from the "Vehicle" branch node above because it has not been assigned its own read permission in the permission map. It has no write permission as it is not a branch node nor an "actuator" data entry node.

The "Vehicle.VehicleIdentification" branch node under the "Vehicle" branch has not been assigned either a read or a write permission in the permission map. As it is under the "Vehicle" branch node, it inherits both the read and the write permissions. It is therefore assigned the "READ_ACCESS" read permission and the "WRITE_ACCESS" write permission.

Note that branch nodes cannot be written to, therefore the write permission is assigned only for inheritance purposes.

The "Vehicle.VehicleIdentification.Model" data entry node is not assigned its own permissions in the permission map. It therefore inherits the "READ_ACCESS" permission from the "Vehicle.VehicleIdentification" branch node. It has no write permission as it is not an "actuator" type data entry node. In this implementation, the model of a vehicle is not considered to be personal information.

In this implementation, the "Vehicle.VehicleIdentification.VIN" data entry node is deemed to be personal information. For that reason, it is assigned the "PERSONAL_INFO" read permission in the permission map. Therefore, it does not inherit the "READ_ACCESS" permission from the "Vehicle.VehicleIdentification" branch node. It has no write permission as it is not an "actuator" type data entry node.

In some implementations, at 204, the vehicle determines whether to grant the access request by comparing the permission value of the permission element of the signal/node with the permission value of the application that requests the signal/node. For example, the application may be assigned the permission value of "READ_ACCESS". In this case, the vehicle can determine that the application is allowed to obtain any signal/node whose read permission element is set to "READ_ACCESS". However, if the permission value of the read permission element of a signal/node is set to "PERSONAL_INFO" (e.g., "Vehicle.VehicleIdentification.VIN"), and the permission value of the application is set to "READ_ACCESS", which does not match the permission value of the read permission element of the signal/node, in this case, the vehicle can reject the request from the application. For example, if the application has only the permission of "READ_ACCESS" and requests to read the "Vehicle.VehicleIdentification" branch node, the application would receive only the value of the "Vehicle.VehicleIdentification.Model" signal. If the application has both "READ_ACCESS" and "PERSONAL_INFO" permissions and requests to read the "Vehicle.VehicleIdentification" branch node, the application would receive the values of both "Vehicle.VehicleIdentification.Model" and "Vehicle.VehicleIdentification.VIN" signals.

In some implementations, the vehicle can further generate a notification after determining whether to grant the access request in 202. The vehicle can output the notification as a user interface of the vehicle, send the notification to a server or a different device (e.g., an application running on the owner's device), or a combination thereof. The notification can indicate that there is an unauthorized attempt to access the vehicle signals/nodes. The notification can include information of the application that sends the request, the signal/node that is requested, the permission value of the signal/node, the permission value of the application, and any combination thereof. In some cases, the vehicle can further trigger an audio or visual alarm indicating the unauthorized access. In some implementations, a combination of different responses discussed previously can be configured for different attempts of unauthorized access to different signals/nodes. Alternatively, or in combination, a combination of different responses discussed previously can be configured for different number of attempts of unauthorized access to the same signals/nodes.

In some cases, different sets of permission values can be used. For example, a hierarchical permission value structure can be used. In such an example, different permission values can represent different permission levels, and the request can be granted if the permission level of the requested party is higher than that of the permission level of the signal/node. For example, an application that requests the signal/node can have a permission value for write permission as class 5. This can indicate that the application is allowed to write to signals/nodes whose write permission value is between class 1 and class 5, but not for signals/nodes whose write permission value is set to a class higher than 5. This approach provides flexibility to protect access of vehicle signals/nodes with different degrees of security-sensitivity.

In one implementation, when an application connected to the vehicle or logged in to the vehicle at the beginning of a session, the application can provide its permission value (or an identifier of its permission value) for read and write permissions of vehicle signals as part of the login process. The vehicle can store the permission value of the application. Thereafter, when the application requests the access to the signal/node, the application may not include the permission value in the request for access as long as the session does not expire. Alternatively, or in combination, the permission value (or the identifier of the permission value) of the requested party can be included in the request for each signal/node access. In some cases, the vehicle can also query the requested part of the signal access for its permission value. The query can be sent after receiving the request or sent after the vehicle determines that the previous stored permission value has expired.

In some cases, the permission value can be assigned to the application (e.g., by using an authorization server or application) by the manufacturer of the vehicle, the operation administrator of the vehicle, the owner of the vehicle, the driver of the vehicle, or any combination thereof. The permission value can be set directly at a user interface of the vehicle, or through a server, e.g., the server 130 in FIG. 1. The identifier of the permission value may be further be encrypted, signed, or both. The encrypted or signed identifier can be sent to the vehicle. This provides additional security and enables the vehicle to verify the authenticity of the permission value.

In some cases, upon determining whether to grant the request, the vehicle can send a response to the requested party. If the request is granted, the response can indicate that the request is granted. In some cases, the response can further include the value of the signal/node that is requested (e.g., in a request for a read permission). The value of a branch node can include values of all nodes under the branch node. If the request is rejected, the response can indicate that the request is rejected, and a reason for the rejection.

Figure 5:
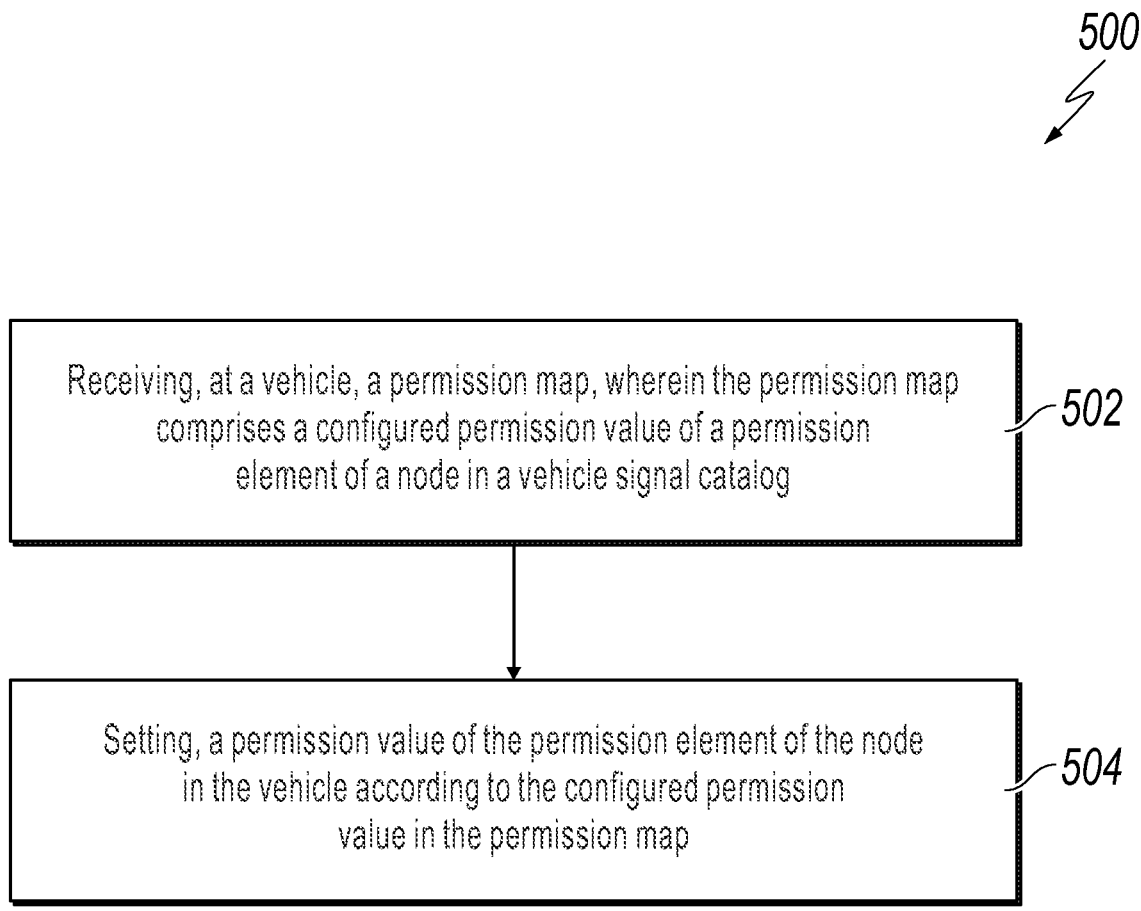
FIG. 5 is a flow diagram showing an example method that configures permissions of vehicle signals, according to an implementation.

FIG. 5 is a flow diagram showing an example method 500 that configures permissions of vehicle signals or nodes in a signal catalog, according to an implementation. The method 500 can be performed by a computing device (e.g., a server) associated with a vehicle manufacturer or an original equipment manufacturer (OEM). The manufacturer or OEM can create the permission map and uses the permission map to populate the permission values for each node in the signal catalog. The method 500 may also be implemented by the entities shown in FIG. 1, including, for example, the vehicle 120 or the server 130. The method 500 shown in FIG. 5 can also be implemented using additional, fewer, or different entities. Furthermore, the method 500 shown in FIG. 5 can be implemented using additional, fewer, or different operations, which can be performed in the order shown or in a different order. In some instances, an operation or a group of operations can be iterated or repeated, for example, for a specified number of iterations or until a terminating condition is reached.

At 502, a permission map is received. As discussed previously, the permission map can include configured permission values for permission elements of nodes in a vehicle signal catalog. As discussed previously, the permission element can be a read permission element or a write permission element, or both. The configured permission values can be pre-defined and represent "READ_ACCESS," "PERSONAL_INFO", "WRITE_ACCESS," or other values.

At 504, a permission value of the permission element of the node in the vehicle signal catalog is set according to the configured permission value in the permission map. As discussed previously, in some operations, the inheritance approach can be used, and the configured permission value can be used to set the permission value of the permission elements of the sub-nodes. Also as discussed previously, default value can be used and overwritten by the permission map.

Figure 6:
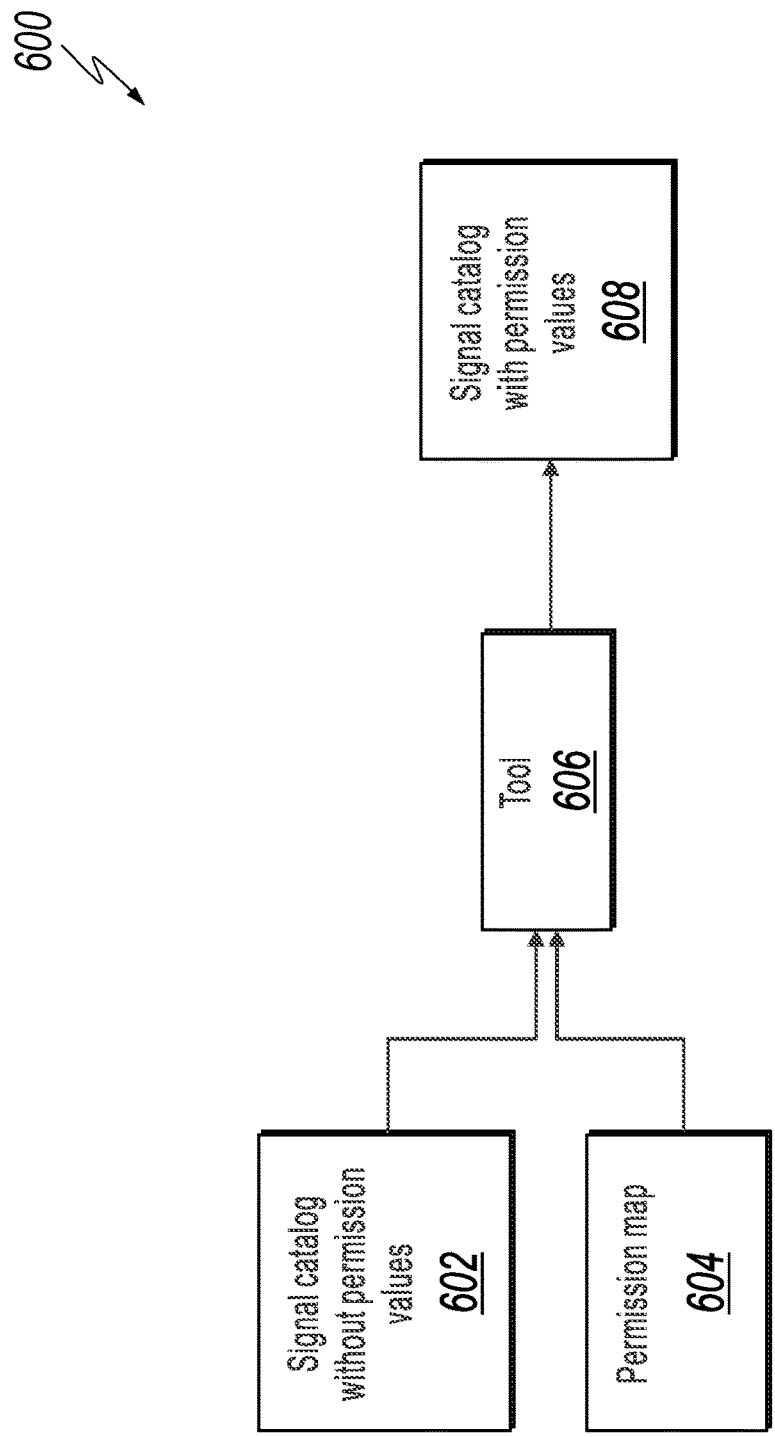
FIG. 6 is a block diagram illustrating permission configuration for vehicle signals, according to an implementation.

FIG. 6 is a block diagram 600 illustrating permission configuration for vehicle signals or nodes in a signal catalog, according to an implementation. As discussed above, a signal catalog without permission values for each node 602 and a permission map 604 can be inputted to a tool 606 that generates a signal catalog with permission values for each node 608. The tool 606 can be a software or hardware tool at a computing device or server associated with a vehicle manufacturer or OEM. The tool 606 can also be at the vehicle.

Figure 3:
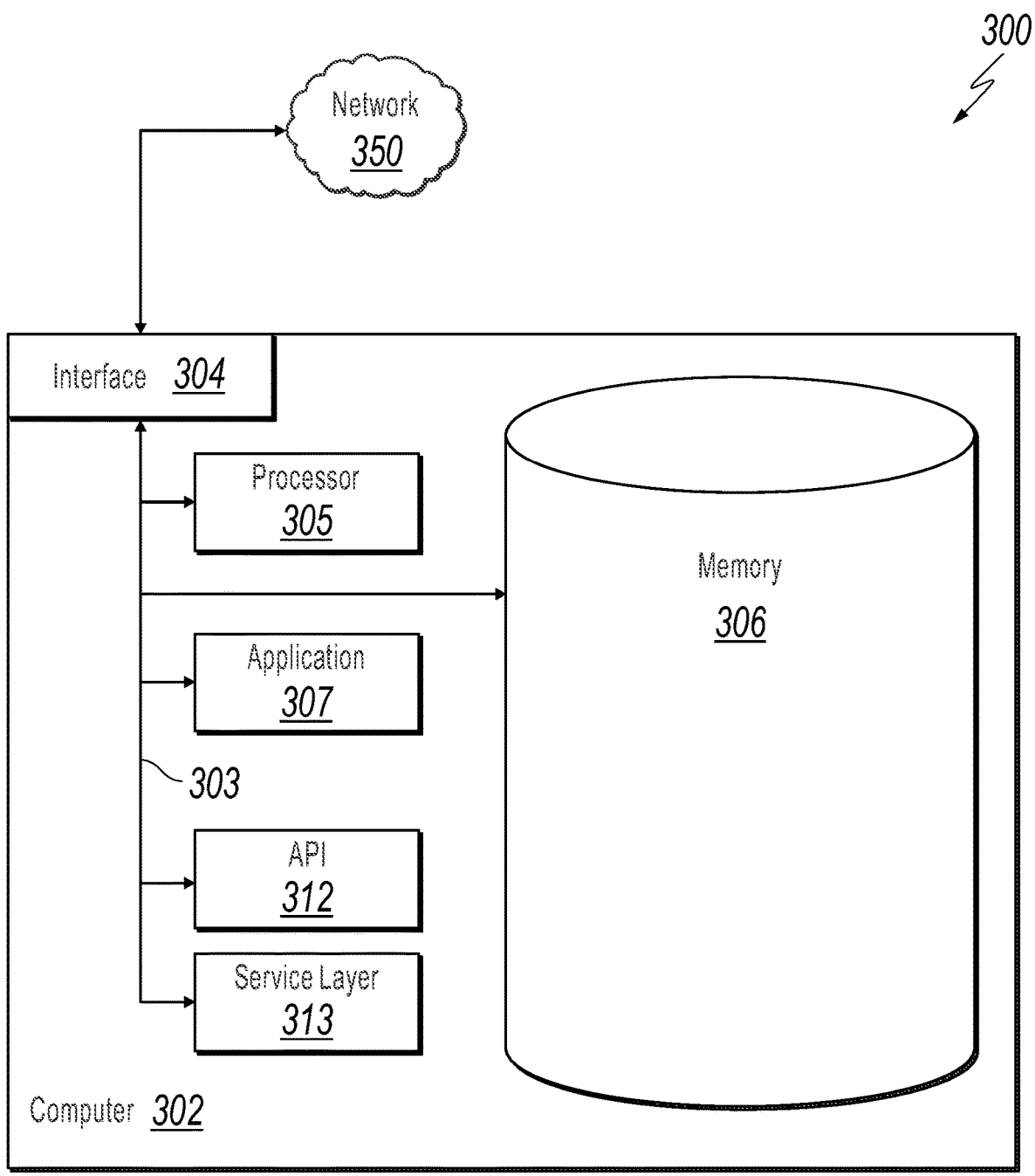
FIG. 3 is a high-level architecture block diagram of a computing system, according to an implementation.

FIG. 3 is a high-level architecture block diagram showing a computer 302 coupled with a network 350, according to an implementation. The described illustration is only one possible implementation of the described subject matter and is not intended to limit the disclosure to the single described implementation. Those of ordinary skill in the art will appreciate the fact that the described components can be connected, combined, or used in alternative ways, consistent with this disclosure.

The network 350 facilitates communications between the computer 302 and other devices. In some cases, a user, e.g., an administrator, can access the computer 302 from a remote network. In these or other cases, the network 350 can be a wireless or a wireline network. In some cases, a user can access the computer 302 locally. In these or other cases, the network 350 can also be a memory pipe, a hardware connection, or any internal or external communication paths between the components.

The computer 302 includes a computing system configured to perform the algorithm described in this disclosure. For example, the computer 302 can be used to implement the server 130 shown in FIG. 1. The computer 302 can be used to implement an electronic device that runs the application 122 shown in FIG. 1, e.g., as a laptop computer or a smart phone. The computer 302 can also be used to implement the permission control module 112 shown in FIG. 1. In some cases, the algorithm can be implemented in an executable computing code, e.g., C/C++ executable code. Alternatively, or in combination, the algorithm can be implemented in an application program, e.g., EXCEL. In some cases, the computer 302 can include a standalone LINUX system that runs batch applications. In some cases, the computer 302 can include mobile or personal computers that run the application program.

The computer 302 may include an input device, such as a keypad, keyboard, touch screen, microphone, speech recognition device, or another device that can accept user information, and/or an output device that conveys information associated with the operation of the computer 302, including digital data, visual and/or audio information, or a GUI.

The computer 302 can serve as a client, network component, a server, a database or other persistency, or the like. In some implementations, one or more components of the computer 302 may be configured to operate within a cloud-computing-based environment.

At a high level, the computer 302 is an electronic computing device operable to receive, transmit, process, store, or manage data and information. According to some implementations, the computer 302 may also include or be communicably coupled with an application server, e-mail server, web server, caching server, streaming data server, business intelligence (BI) server, and/or other server.

The computer 302 can receive requests over network 350 from a client application (e.g., executing on a user device) and respond to the received requests by processing said requests in an appropriate software application. In addition, requests may also be sent to the computer 302 from internal users (e.g., from a command console or by another appropriate access method), external or third parties, other automated applications, as well as any other appropriate entities, individuals, systems, or computers.

Each of the components of the computer 302 can communicate using a system bus 303. In some implementations, any and/or all the components of the computer 302, both hardware and/or software, may interface with each other and/or the interface 304 over the system bus 303, using an application programming interface (API) 312 and/or a service layer 313. The API 312 may include specifications for routines, data structures, and object classes. The API 312 may be either computer language-independent or -dependent and refer to a complete interface, a single function, or even a set of APIs. The service layer 313 provides software services to the computer 302. The functionality of the computer 302 may be accessible for all service consumers using this service layer. Software services, such as those provided by the service layer 313, provide reusable, defined business functionalities through a defined interface. For example, the interface may be software written in JAVA, C++, or other suitable language providing data in Extensible Markup Language (XML) format or another suitable format. While illustrated as an integrated component of the computer 302, alternative implementations may illustrate the API 312 and/or the service layer 313 as stand-alone components in relation to other components of the computer 302. Moreover, any or all parts of the API 312 and/or the service layer 313 may be implemented as child or sub-modules of another software module or hardware module, without departing from the scope of this disclosure.

The computer 302 includes an interface 304. Although illustrated as a single interface 304 in FIG. 3, two or more interfaces 304 may be used according to particular needs, configurations, or particular implementations of the computer 302. The interface 304 is used by the computer 302 for communicating with other systems in a distributed environment connected to the network 350—(whether illustrated or not). Generally, the interface 304 comprises logic encoded in software and/or hardware in a suitable combination and operable to communicate with the network 350. More specifically, the interface 304 may comprise software supporting one or more communication protocols associated with communications such that the network 350 or the interface's hardware are operable to communicate physical signals.

The computer 302 includes a processor 305. Although illustrated as a single processor 305 in FIG. 3, two or more processors may be used according to particular needs, configurations, or particular implementations of the computer 302. Generally, the processor 305 executes instructions and manipulates data to perform the operations of the computer 302. In some cases, the processor 305 can include a data processing apparatus.

The computer 302 also includes a memory 306 that holds data for the computer 302. Although illustrated as a single memory 306 in FIG. 3, two or more memories may be used according to particular needs, configurations, or particular implementations of the computer 302. While memory 306 is illustrated as an integral component of the computer 302, in alternative implementations, memory 306 can be external to the computer 302.

The application 307 comprises an algorithmic software engine providing functionality according to particular needs, configurations, or particular implementations of the computer 302. Although illustrated as a single application 307, the application 307 may be implemented as multiple applications 307 on the computer 302. In addition, although illustrated as integral to the computer 302, in alternative implementations, the application 307 can be external to the computer 302.

There may be any number of computers 302 associated with, or external to, the system 300 and communicating over network 350. Further, the terms "client," "user," and other appropriate terminology may be used interchangeably, as appropriate, without departing from the scope of this disclosure. Moreover, this disclosure contemplates that many users may use one computer 302, or that one user may use multiple computers 302.

Described implementations of the subject matter can include one or more features, alone or in combination.

For example, in a first implementation, a method, comprising: receiving a permission map, wherein the permission map comprises a configured permission value of a permission element of a node in a vehicle signal catalog; and setting a permission value of the permission element of the node in the vehicle signal catalog according to the configured permission value in the permission map The foregoing and other described implementations can each, optionally, include one or more of the following features:

A first feature, combinable with any of the following features, wherein the vehicle signal catalog is based on Vehicle Signal Specification (VSS) of Connected Vehicle Systems Alliance (COVESA).

A second feature, combinable with any of the previous or following features, wherein the permission element is a read permission element or a write permission element.

A third feature, combinable with any of the previous or following features, wherein the permission value is from a set of pre-defined permission values.

A fourth feature, combinable with any of the previous or following features, wherein the permission value indicates that read access to a signal value of the node is limited to a selected group of applications having a same permission value.

A fifth feature, combinable with any of the previous or following features, wherein the node is a branch node, and the method further comprises: setting a permission value of the permission element of a sub-node of the node in the vehicle signal catalog according to the configured permission value in the permission map.

A sixth feature, combinable with any of the previous features, wherein setting a permission value of the permission element of a sub-node of the node in the vehicle signal catalog comprise: determining whether the permission map includes a permission value of the permission element of the sub-node; and in response to determining that the permission map does not include a permission value of the permission element of the sub-node, setting the permission value of the permission element of the sub-node to be the same as the configured permission value.

In a second implementation, a computing device, comprising: at least one hardware processor; and one or more computer-readable storage media coupled to the at least one hardware processor and storing programming instructions for execution by the at least one hardware processor, wherein the programming instructions, when executed, cause the computing device to perform operations comprising: receiving a permission map, wherein the permission map comprises a configured permission value of a permission element of a node in a vehicle signal catalog; and setting a permission value of the permission element of the node in the vehicle signal catalog according to the configured permission value in the permission map.

The foregoing and other described implementations can each, optionally, include one or more of the following features:

A first feature, combinable with any of the following features, wherein the vehicle signal catalog is based on Vehicle Signal Specification (VSS) of Connected Vehicle Systems Alliance (COVESA).

A second feature, combinable with any of the previous or following features, wherein the permission element is a read permission element or a write permission element.

A third feature, combinable with any of the previous or following features, wherein the permission value is from a set of pre-defined permission values.

A fourth feature, combinable with any of the previous or following features, wherein the permission value indicates that read access to a signal value of the node is limited to a selected group of applications having a same permission value.

A fifth feature, combinable with any of the previous or following features, wherein the node is a branch node, and the operations further comprise: setting a permission value of the permission element of a sub-node of the node in the vehicle signal catalog according to the configured permission value in the permission map.

A sixth feature, combinable with any of the previous features, wherein setting a permission value of the permission element of a sub-node of the node in the vehicle signal catalog comprise: determining whether the permission map includes a permission value of the permission element of the sub-node; and in response to determining that the permission map does not include a permission value of the permission element of the sub-node, setting the permission value of the permission element of the sub-node to be the same as the configured permission value.

In a third implementation, a computer-readable medium storing instructions which, when executed, cause a computing device to perform operations comprising: receiving a permission map, wherein the permission map comprises a configured permission value of a permission element of a node in a vehicle signal catalog; and setting a permission value of the permission element of the node in the vehicle signal catalog according to the configured permission value in the permission map.

The foregoing and other described implementations can each, optionally, include one or more of the following features:

A first feature, combinable with any of the following features, wherein the vehicle signal catalog is based on Vehicle Signal Specification (VSS) of Connected Vehicle Systems Alliance (COVESA).

A second feature, combinable with any of the previous or following features, wherein the permission element is a read permission element or a write permission element.

A third feature, combinable with any of the previous or following features, wherein the permission value is from a set of pre-defined permission values.

A fourth feature, combinable with any of the previous or following features, wherein the permission value indicates that read access to a signal value of the node is limited to a selected group of applications having a same permission value.

A fifth feature, combinable with any of the previous or following features, wherein the node is a branch node, and the operations further comprise: setting a permission value of the permission element of a sub-node of the node in the vehicle signal catalog according to the configured permission value in the permission map.

A sixth feature, combinable with any of the previous features, wherein setting a permission value of the permission element of a sub-node of the node in the vehicle signal catalog comprise: determining whether the permission map includes a permission value of the permission element of the sub-node; and in response to determining that the permission map does not include a permission value of the permission element of the sub-node, setting the permission value of the permission element of the sub-node to be the same as the configured permission value.

Some of the subject matter and operations described in this disclosure can be implemented in digital electronic circuitry, or in computer software, firmware, or hardware, including the structures described in this disclosure and their structural equivalents, or in combinations of one or more of them. Some of the subject matter described in this disclosure can be implemented as one or more computer programs, i.e., one or more modules of computer program instructions, encoded on a computer storage medium for execution by, or to control the operation of, data-processing apparatus. Alternatively, or in addition, the program instructions can be encoded on an artificially generated propagated signal, for example, a machine-generated electrical, optical, or electromagnetic signal that is generated to encode information for transmission to suitable receiver apparatus for execution by a data processing apparatus. The computer-storage medium can be a machine-readable storage device, a machine-readable storage substrate, a random or serial access memory device, or any combinations of computer-storage mediums.

The terms "data-processing apparatus," "computer," or "electronic computer device" encompass all kinds of apparatus, devices, and machines for processing data, including, by way of example, a programmable processor, a computer, a system on a chip, or multiple ones, or combinations of the foregoing. The apparatus can include special purpose logic circuitry, e.g., an FPGA (field programmable gate array) or an ASIC (application specific integrated circuit). In some implementations, the data processing apparatus or special purpose logic circuitry (or a combination of the data processing apparatus or special purpose logic circuitry) may be hardware- or software-based (or a combination of both hardware- and software-based). The apparatus can optionally include code that creates an execution environment for computer programs, for example, code that constitutes processor firmware, a protocol stack, a database management system, an operating system, or a combination of execution environments. The present disclosure contemplates the use of data processing apparatuses with or without conventional operating systems, for example LINUX, UNIX, WINDOWS, MAC OS, ANDROID, IOS, or any other suitable, conventional operating system.

A computer program, which may also be referred to, or described, as a program, software, a software application, a module, a software module, a script, or code, can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, for example, one or more scripts stored in a markup language document, in a single file dedicated to the program in question, or in multiple coordinated files, for example, files that store one or more modules, sub-programs, or portions of code. A computer program can be deployed to be executed on one computer or on multiple computers that are located at one site or distributed across multiple sites and interconnected by a communication network. While portions of the programs illustrated in the various figures are shown as individual modules that implement the various features and functionality through various objects, methods, or other processes, the programs may, instead, include a number of sub-modules, third-party services, components, libraries, and such, as appropriate. Conversely, the features and functionality of various components can be combined into single components, as appropriate.

Some of the processes and logic flows described in this disclosure can be performed by one or more programmable processors, executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and processors of any kind of digital computer. Generally, a processor will receive instructions and data from a read-only memory or a random-access memory, or both. A processor can include, by way of example, a programmable processor, a computer, a system on a chip, or multiple ones, or combinations of the foregoing. A processor can include special purpose logic circuitry, e.g., a CPU (central processing unit), an FPGA (field programmable gate array) or an ASIC (application specific integrated circuit).

Computers suitable for the execution of a computer program can be based on general or special purpose microprocessors, both, or any other kind of CPU. Generally, a CPU will receive instructions and data from a read-only memory (ROM) or a random-access memory (RAM), or both. The essential elements of a computer are a CPU, for performing or executing instructions, and one or more memory devices, for storing instructions and data. Generally, a computer will also include, or be operatively coupled to, receive data from or transfer data to, or both, one or more mass storage devices for storing data, for example, magnetic, magneto-optical disks, or optical disks. However, a computer need not have such devices. Moreover, a computer can be embedded in another device, for example, a mobile telephone, a personal digital assistant (PDA), a mobile audio or video player, a game console, a global positioning system (GPS) receiver, or a portable storage device, for example, a universal serial bus (USB) flash drive, to name just a few.

Computer-readable media (transitory or non-transitory, as appropriate) suitable for storing computer program instructions and data include all forms of non-volatile memory, media and memory devices, including, by way of example, semiconductor memory devices, for example, erasable programmable read-only memory (EPROM), electrically erasable programmable read-only memory (EEPROM), and flash memory devices; magnetic disks, for example, internal hard disks or removable disks; magneto-optical disks; and CD-ROM, DVD+/–R, DVD-RAM, and DVD-ROM disks. The memory may store various objects or data, including caches, classes, frameworks, applications, backup data, jobs, web pages, web page templates, database tables, repositories storing dynamic information, and any other appropriate information including any parameters, variables, algorithms, instructions, rules, constraints, or references thereto. Additionally, the memory may include any other appropriate data, such as logs, policies, security or access data, reporting files, as well as others. The processor and the memory can be supplemented by, or incorporated in, special purpose logic circuitry. In some cases, the computer storage medium can be transitory, non-transitory, or a combination thereof.

To provide for interaction with a user, implementations of the subject matter described in this disclosure can be implemented on a computer having a display device, for example, a CRT (cathode ray tube), LCD (liquid crystal display), LED (Light Emitting Diode), or plasma monitor, for displaying information to the user and a keyboard and a pointing device, for example, a mouse, trackball, or trackpad by which the user can provide input to the computer. Input may also be provided to the computer using a touchscreen, such as a tablet computer surface with pressure sensitivity, a multi-touch screen using capacitive or electric sensing, or other type of touchscreen. Other kinds of devices can be used to provide for interaction with a user as well; for example, feedback provided to the user can be any form of sensory feedback, for example, visual feedback, auditory feedback, or tactile feedback; and input from the user can be received in any form, including acoustic, speech, or tactile input. In addition, a computer can interact with a user by sending documents to, and receiving documents from, a device that is used by the user, for example, by sending web pages to a web browser on a user's client device in response to requests received from the web browser.

The term "graphical user interface," or "GUI," may be used in the singular or the plural to describe one or more graphical user interfaces and each of the displays of a particular graphical user interface. Therefore, a GUI may represent any graphical user interface, including but not limited to, a web browser, a touch screen, or a command line interface (CLI) that processes information and efficiently presents the information results to the user. In general, a GUI may include a plurality of user interface (UI) elements, some or all associated with a web browser, such as interactive fields, pull-down lists, and buttons operable by the business suite user. These and other UI elements may be related to or represent the functions of the web browser.

The term "real-time," "real time," "realtime," "real (fast) time (RFT)," "near(ly) real-time (NRT)," "quasi real-time," or similar terms (as understood by one of ordinary skill in the art), means that an action and a response are temporally proximate such that an individual perceives the action and the response occurring substantially simultaneously. For example, the time difference for a response to display (or for an initiation of a display) of data following the individual's action to access the data may be less than 1 ms, less than 1 sec., less than 5 secs., etc. While the requested data need not be displayed (or initiated for display) instantaneously, it is displayed (or initiated for display) without any intentional delay, taking into account processing limitations of a described computing system and time required to, for example, gather, accurately measure, analyze, process, store, or transmit the data.

Implementations of the subject matter described in this disclosure can be implemented in a computing system that includes a back-end component, for example, as a data server, or that includes a middleware component, for example, an application server, or that includes a front-end component, for example, a client computer having a graphical user interface or a Web browser through which a user can interact with an implementation of the subject matter described in this disclosure, or any combination of one or more such back-end, middleware, or front-end components. The components of the system can be interconnected by any form or medium of wireline or wireless digital data communication (or a combination of data communication), for example, a communication network. Examples of communication networks include a local area network (LAN), a radio access network (RAN), a metropolitan area network (MAN), a wide area network (WAN), Worldwide Interoperability for Microwave Access (WIMAX), a wireless local area network (WLAN) using, for example, 802.11 a/b/g/n or 802.20 (or a combination of 802.11x and 802.20 or other protocols consistent with this disclosure), all or a portion of the Internet, or any other communication system, or systems at one or more locations (or a combination of communication networks). The network may communicate with, for example, Internet Protocol (IP) packets, Frame Relay frames, Asynchronous Transfer Mode (ATM) cells, voice, video, data, or other suitable information (or a combination of communication types) between network addresses.

The computing system can include clients and servers. A client and server are generally remote from each other and typically interact through a communication network. The relationship of client and server arises by virtue of computer programs running on the respective computers and having a client-server relationship to each other.

In some implementations, any or all of the components of the computing system, either hardware or software (or a combination of hardware and software), may interface with each other, or the interface using an application programming interface (API), or a service layer (or a combination of API and service layer). The API may include specifications for routines, data structures, and object classes. The API may be either computer language, independent or dependent, and refer to a complete interface, a single function, or even a set of APIs. The service layer provides software services to the computing system. The functionality of the various components of the computing system may be accessible for all service consumers using this service layer. Software services provide reusable, defined business functionalities through a defined interface. For example, the interface may be software written in JAVA, C++, or other suitable language providing data in extensible markup language (XML) format or another suitable format. The API or service layer (or a combination of the API and the service layer) may be an integral or a stand-alone component in relation to other components of the computing system. Moreover, any or all parts of the service layer may be implemented as child or sub-modules of another software module, or hardware module without departing from the scope of this disclosure.

While this disclosure contains many specific implementation details, these should not be construed as limitations on the scope of any invention or on the scope of what may be claimed, but rather as descriptions of features that may be specific to particular implementations of particular inventions. Certain features that are described in this disclosure in the context of separate implementations can also be implemented, in combination, in a single implementation. Conversely, various features that are described in the context of a single implementation can also be implemented in multiple implementations, separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Particular implementations of the subject matter have been described. Other implementations, alterations, and permutations of the described implementations are within the scope of the following claims as will be apparent to those skilled in the art. While operations are depicted in the drawings or claims in a particular order, this should not be understood as requiring that such operations be performed in the particular order shown or in sequential order, or that all illustrated operations be performed (some operations may be considered optional), to achieve desirable results. In certain circumstances, multitasking or parallel processing (or a combination of multitasking and parallel processing) may be advantageous and performed as deemed appropriate.

Moreover, the separation or integration of various system modules and components in the implementations described above should not be understood as requiring such separation or integration in all implementations, and it should be understood that the described program components and systems can, generally, be integrated together in a single software product or packaged into multiple software products.

Accordingly, the above description of example implementations does not define or constrain this disclosure. Other changes, substitutions, and alterations are also possible without departing from the spirit and scope of this disclosure.

Furthermore, any claimed implementation below is considered to be applicable to at least a computer-implemented method; a non-transitory, computer-readable medium storing computer-readable instructions to perform the computer-implemented method; and a computer system comprising a computer memory interoperably coupled with a hardware processor configured to perform the computer-implemented method or the instructions stored on the computer-readable medium.

The invention claimed is:

1. A method, comprising:
receiving, at a vehicle, a permission map, wherein the permission map comprises a configured permission value of a permission element of a node in a vehicle signal catalog, wherein the node represents a vehicle signal, and the permission element of the node is defined according to Vehicle Signal Specification (VSS) of Connected Vehicle Systems Alliance;
setting, by the vehicle, a permission value of the permission element of the vehicle signal in the vehicle according to the configured permission value in the permission map, wherein the permission value is one of a set of permission values, the set of permission values including a permission value corresponding to personal information for a read permission element;
determining that the permission map does not include a permission value of a permission element of a sub-node of the node, wherein the node is a branch node defined in VSS of Connected Vehicle Systems Alliance;
in response to determining that the permission map does not include the permission value of the permission element of the sub-node, setting the permission value of the permission element of the sub-node to be the same as the configured permission value of the permission element of the node; and controlling at least one hardware component of the vehicle by using the vehicle signal according to the permission value of the permission element of the vehicle signal.

2. The method of claim 1, wherein the permission element is a read permission element or a write permission element.

3. The method of claim 1, wherein the permission value is from a set of pre-defined permission values.

4. The method of claim 1, wherein the permission value indicates that read access to a signal value of the node is limited to a selected group of applications having a same permission value.

5. A computing device, comprising:

at least one hardware processor; and one or more computer-readable storage media coupled to the at least one hardware processor and storing programming instructions for execution by the at least one hardware processor, wherein the programming instructions, when executed, cause the computing device to perform operations comprising:

receiving, at a vehicle, a permission map, wherein the permission map comprises a configured permission value of a permission element of a node in a vehicle signal catalog, wherein the node represents a vehicle signal, and the permission element of the node is defined according to Vehicle Signal Specification (VSS) of Connected Vehicle Systems Alliance;

setting, by the vehicle, a permission value of the permission element of the vehicle signal in the vehicle according to the configured permission value in the permission map, wherein the permission value is one of a set of permission values, the set of permission values including a permission value corresponding to personal information for a read permission element;

determining that the permission map does not include a permission value of a permission element of a sub-node of the node, wherein the node is a branch node defined in VSS of Connected Vehicle Systems Alliance;

in response to determining that the permission map does not include the permission value of the permission element of the sub-node, setting the permission value of the permission element of the sub-node to be the same as the configured permission value of the permission element of the node; and controlling at least one hardware component of the vehicle by using the vehicle signal according to the permission value of the permission element of the vehicle signal.

6. The computing device of claim 5, wherein the permission element is a read permission element or a write permission element.

7. The computing device of claim 5, wherein the permission value is from a set of pre-defined permission values.

8. The computing device of claim 5, wherein the permission value indicates that read access to a signal value of the node is limited to a selected group of applications having a same permission value.

9. A non-transitory computer-readable medium storing instructions which, when executed, cause a computing device to perform operations comprising:

receiving, at a vehicle, a permission map, wherein the permission map comprises a configured permission value of a permission element of a node in a vehicle signal catalog, wherein the node represents a vehicle signal, and the permission element of the node is defined according to Vehicle Signal Specification (VSS) of Connected Vehicle Systems Alliance;

setting, by the vehicle, a permission value of the permission element of the vehicle signal in the vehicle according to the configured permission value in the permission map, wherein the permission value is one of a set of permission values, the set of permission values including a permission value corresponding to personal information for a read permission element;

determining that the permission map does not include a permission value of a permission element of a sub-node of the node, wherein the node is a branch node defined in VSS of Connected Vehicle Systems Alliance;

in response to determining that the permission map does not include the permission value of the permission element of the sub-node, setting the permission value of the permission element of the sub-node to be the same as the configured permission value of the permission element of the node; and controlling at least one hardware component of the vehicle by using the vehicle signal according to the permission value of the permission element of the vehicle signal.

10. The computer-readable medium of claim 9, wherein the permission element is a read permission element or a write permission element.

11. The computer-readable medium of claim 9, wherein the permission value is from a set of pre-defined permission values.

12. The computer-readable medium of claim 9, wherein the permission value indicates that read access to a signal value of the node is limited to a selected group of applications having a same permission value.

* * * * *